United States Patent
Hughes et al.

(10) Patent No.: US 7,877,558 B2
(45) Date of Patent: Jan. 25, 2011

(54) MEMORY CONTROLLER PRIORITIZATION SCHEME

(75) Inventors: William A. Hughes, San Jose, CA (US); Vydhyanathan Kalyanasundharam, San Jose, CA (US); Philip E. Madrid, Austin, TX (US); Roger Isaac, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 725 days.

(21) Appl. No.: 11/837,943

(22) Filed: Aug. 13, 2007

(65) Prior Publication Data

US 2009/0049256 A1 Feb. 19, 2009

(51) Int. Cl.
G06F 12/00 (2006.01)
G06F 13/00 (2006.01)
G06F 13/28 (2006.01)

(52) U.S. Cl. .................... 711/158; 711/159
(58) Field of Classification Search .......... 711/158–159
See application file for complete search history.

(56) References Cited

U.S. PATENT DOCUMENTS

| | | | |
|---|---|---|---|
| 6,170,042 B1 * | 1/2001 | Gaertner et al. ............. | 711/158 |
| 6,182,177 B1 * | 1/2001 | Harriman .................... | 710/112 |
| 6,381,683 B1 | 4/2002 | Strongin et al. | |
| 6,510,497 B1 | 1/2003 | Strongin et al. | |
| 6,732,242 B2 * | 5/2004 | Hill et al. ................... | 711/158 |
| 7,210,009 B2 | 4/2007 | Gulick et al. | |
| 2002/0002655 A1 * | 1/2002 | Hoskins ..................... | 711/112 |
| 2003/0070055 A1 * | 4/2003 | Johnson et al. ............. | 711/202 |
| 2005/0055517 A1 * | 3/2005 | Olds et al. .................. | 711/158 |
| 2008/0077720 A1 * | 3/2008 | Fanning ..................... | 710/240 |

* cited by examiner

Primary Examiner—Kevin L Ellis
Assistant Examiner—Ryan Bertram
(74) Attorney, Agent, or Firm—Rory D. Rankin; Meyertons, Hood, Kivlin, Kowert & Goetzel, P.C.

(57) ABSTRACT

A system includes a processor coupled to a memory through a memory controller. The memory controller includes first and second queues. The memory controller receives memory requests from the processor, assigns a priority to each request, stores each request in the first queue, and schedules processing of the requests based on their priorities. The memory controller changes the priority of a request in the first queue in response to a trigger, sends a next scheduled request from the first queue to the second queue in response to detecting the next scheduled request has the highest priority of any request in the first queue, and sends requests from the second queue to the memory. The memory controller changes the priority of different types of requests in response to different types of triggers. The memory controller maintains a copy of each request sent to the second queue in the first queue.

21 Claims, 6 Drawing Sheets

MEMORY CONTROLLER PRIORITIZATION SCHEME

BACKGROUND OF THE INVENTION

1. Field of the Invention

This invention relates to computer processors and, more particularly, to controlling requests to read data from and write data to memory.

2. Description of the Related Art

Microprocessors have evolved to include a variety of features aimed at improving the speed and efficiency with which instructions are executed. In addition to advances in clock speed and the resulting reduction in instruction execution time, microprocessors may include pipelines, multiple cores, multiple execution units, etc. that permit some degree of parallel instruction execution. Further performance improvements have also been realized through a variety of buffering, queuing, and caching features intended to overcome bottlenecks in the movement of data to and from system memory. For example, microprocessors often include multiple memory caches, arranged hierarchically and shared by multiple cores or execution units. Since cache accesses are faster than memory accesses, various caching techniques are used to increase the likelihood that data is located in a cache when needed by a core or execution unit.

Despite the improvements noted above, there remains room for optimization of the bandwidth and latency involved in accessing system memory. For instance, in a typical computer system in which a processor may include a memory controller coupled to system memory through a memory bus, it may be advantageous to optimize the bandwidth on the memory bus by accumulating memory requests in a queue and periodically re-ordering the queue contents. Different types of memory requests have different requirements for bandwidth and/or latency. Various prioritization strategies have been tried to address these concerns.

One way to optimize latency takes note of the fact that a prefetch from memory may have no stringent latency requirement whereas it may be highly desirable to minimize latency for a demand read request to the same address. Consequently, prefetches may be assigned a lower priority then demand read requests. Unfortunately, low-priority prefetches may accumulate in the queue and be bypassed by higher-priority demand read requests. Accumulated prefetches may then only be processed if there are no higher priority requests in the queue.

Another optimization attempts to account for any reduction in effective bandwidth achievable on the memory bus that may be caused by the time to switch between read and write accesses. Conventionally, write requests may be given lower priority than read requests since read requests have more stringent latency requirements. Unfortunately, write requests may accumulate in the queue while being bypasses by higher-priority read requests, to be processed only if no higher priority requests are in the queue.

The latency requirement of isochronous memory requests are another concern that may provide an opportunity for optimization. These requests may be able to tolerate long latencies as long as a maximum latency is not exceeded. Otherwise, dropped video frames and/or audio popping may occur. Typically, isochronous latency requirements are addressed by assigned a high priority compared to other traffic. Unfortunately, this may cause normal read requests to be bypassed in the queue even when pending isochronous request are well below their latency maximum. In addition, arrival of a high priority isochronous request may cause a new page to be opened while lower priority requests for an already opened page are bypassed, causing the opened page to be closed and resulting in poor page management performance.

In order to address the above concerns, what is desired is a way to flexibly prioritize memory requests that is sensitive to the latency and bandwidth requirements of various types of memory requests.

SUMMARY OF THE INVENTION

Various embodiments of a system and methods are disclosed. In one embodiment, the system comprises a processor coupled to a memory through a memory controller. The memory controller comprises a first queue and a second queue. The memory controller is configured to receive memory requests from the processor, assign a priority to each received memory request, store each received memory request in the first queue, and schedule processing of the stored memory requests based on their assigned priorities. The memory controller is further configured to change the value of the priority of a memory request in the first queue in response to a trigger, send a next scheduled memory request from the first queue to the second queue in response to detecting that the next scheduled memory request has the highest priority of any memory request in the first queue, and send memory requests from the second queue to the memory.

In a further embodiment, the memory controller is further configured to change the priority of different types of memory requests in response to corresponding different types of triggers. In a still further embodiment, the memory controller is further configured to maintain a copy of each memory request that is sent to the second queue in the first queue until the memory request is processed out of the second queue.

In a still further embodiment in which at least one stored memory request is a write request, the trigger comprises detecting that the number of write requests stored in the first queue is greater than or equal to a programmable threshold value. The memory controller is configured to increase the priority of any write requests stored in the first queue in response to the trigger.

In a still further embodiment in which at least one stored memory request is an isochronous memory request, the trigger comprises detecting that at least one isochronous memory request has been pending in the first queue for at least a programmable, predetermined time period. The memory controller is configured to increase the priority of any isochronous memory requests stored in the first queue in response to the trigger.

In a still further embodiment in which at least one stored memory request is a prefetch request, the trigger comprises detecting that a demand read request whose address matches the address of at least one of the at least one stored prefetch requests has been received in the first queue. The memory controller is configured to increase the priority of any prefetch requests whose addresses match the address of the demand read request in response to the trigger.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
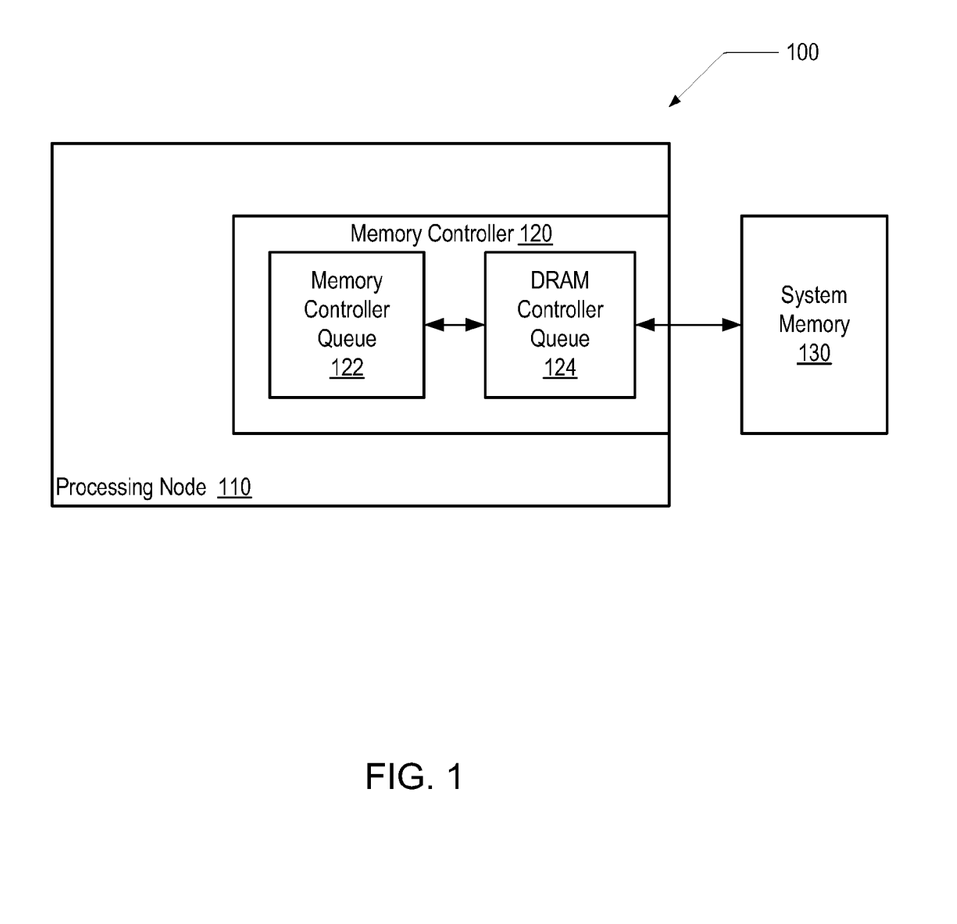
FIG. 1 is a generalized block diagram of one embodiment of a computer system.

FIG. 1 is a generalized block diagram of one embodiment of a computer system 100. A variety of other embodiments are also contemplated. In the illustrated embodiment, a processing node 110 is shown coupled to a system memory 130. Processing node 110 may include one or more processing cores and/or execution units for executing instructions. In the illustrated embodiment, processing node 110 includes a memory controller 120. Memory controller 120 may include a memory controller queue 122 coupled to a DRAM controller queue 124, which may in turn be coupled to system memory 130. During operation, the processing cores or execution units of processing node 110 may access system memory 130 through memory controller 120.

Although in the illustrated embodiment, memory controller 120 is included within processing node 110, in alternative embodiments, memory controller 120 maybe separate from processing node 110. In addition, while system 100, as shown, includes one processing node 110, in alternative embodiments system 100 may include any number of additional processing nodes and system memories. In further alternative embodiments, multiple processing nodes may share one or more system memories. In some embodiments, processing node 110 may include one or more cache memories between memory controller 120 and the cores or execution units. Cache memories may hold instructions and/or data and provide faster access to these items than accesses from system memory. Cache memories may be arranged hierarchically. In some embodiments, some levels of the cache hierarchy may be located within processing node 110 and, if a memory controller is located outside of processing node 110, other levels of the cache hierarchy may also be located outside of processing node 110. In some embodiments, multiple processing nodes may share such external caches. A variety of processing node configurations will be apparent to one of ordinary skill in the art.

To simplify discussion, system memory 130 may be referred to herein as DRAM. However, system memory 130 may include a variety of storage devices such as SDRAM, SRAM, ROM, DRAM and/or other conventional system memory devices. System memory 130 may be organized architecturally as a SIMM, DIMM, DDR, RAMBUS, fully buffered DIMM (FB-DIMM), or other suitable configuration of storage devices. A variety of memory configurations will be apparent to one of ordinary skill in the art.

Figure 2:
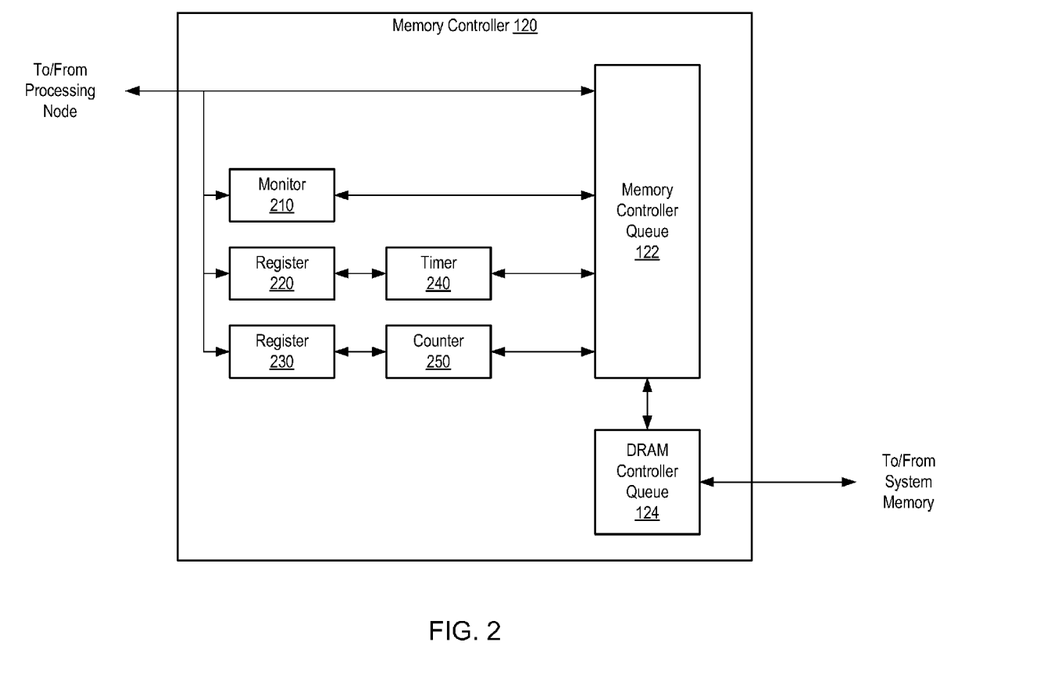
FIG. 2 is a detailed block diagram of one embodiment of memory controller.

FIG. 2 is a detailed block diagram of one embodiment of memory controller 120. In the illustrated embodiment, memory controller 120 includes a memory controller queue (MCQ) 122, a DRAM controller queue (DCQ) 124, a monitor 210, registers 220 and 230, a timer 240, and a counter 250. MCQ 122 may be coupled to one or more processing cores or execution units to receive memory requests. As noted above, MCQ 122 may be further coupled to DCQ 124, which may in turn be coupled to system memory 130. Monitor 210 may be coupled to one or more processing cores or execution units and to MCQ 122. Register 220 may be coupled to one or more processing cores or execution units and to timer 240, which may in turn be coupled to MCQ 122. Register 230 may be coupled to one or more processing cores or execution units and to counter 250, which may in turn be coupled to MCQ 122.

During operation, memory requests may be received by memory controller 120 where they may be buffered, prioritized, and conveyed to system memory. More specifically, memory requests may be received, assigned an initial priority, and buffered in MCQ 122. Buffered memory requests may be scheduled according to priority and stored until space becomes available in DCQ 124. DCQ 124 is typically a smaller queue than MCQ 122. DCQ 124 may be configured to optimize DRAM bus utilization. When there is space available in DCQ 124, the next scheduled memory request may be conveyed to DCQ 124. DCQ 124 may further convey each memory request to DRAM according to its assigned priority. MCQ 122 may retain a queue entry corresponding to a request that has been passed to DCQ 124. The priority of each memory request in MCQ 122 may be changed dynamically according to processes that will be described below. If the priority of a request in MCQ 122 that corresponds to a request stored in DCQ 124 is changed, the priority of the corresponding request in DCQ 124 may also be changed.

In one embodiment, memory controller 120 may adjust the priority of prefetch memory requests in the following manner. When first received, prefetches may be assigned a low priority as they are enqueued in MCQ 122. Subsequently, as additional memory requests are received, monitor 210 may compare the address of any newly arrived demand read memory request to the addresses of any pending prefetches in MCQ 122. If the address of a newly arrived demand read matches the address of a pending prefetch, the priority of the prefetch may be changed to match the priority of the demand read, typically a medium priority. Once the priority of a prefetch has changed, it may be re-scheduled relative to any other pending memory requests in MCQ 122. If a corresponding prefetch is pending in DCQ 124, its priority may also be changed. Such pending memory requests may then be re-scheduled relative to any other pending memory requests in DCQ 124.

In a further embodiment, memory controller 120 may adjust the priority of isochronous memory requests in the following manner. When first received, isochronous memory requests may be assigned a medium priority as they are enqueued in MCQ 122. If a received isochronous memory request is the first isochronous request in MCQ 122, timer 240 may be reset and started. Once started, timer 240 may be configured to trigger after a configurable time determined by a value stored in register 220. The value that is stored in register 220 may be programmed by software executing on a processing core or execution unit that is coupled to the memory controller. For example, in one embodiment, the value may be chosen to be large compared with typical, lightly loaded DRAM latencies but small compared with the maximum latency allowed for isochronous memory requests. When timer 240 triggers, the priority of the pending isochronous memory request, and any subsequently received and pending isochronous memory requests, may be changed to high. Once the priorities of the pending isochronous memory requests have been changed, they may be re-scheduled relative to any other pending memory requests in MCQ 122. If any corresponding isochronous memory requests are pending in DCQ 124, their priorities may also be changed. Such pending memory requests may then be re-scheduled relative to any other pending memory requests in DCQ 124. After the priorities of the pending isochronous memory requests have been changed and when another isochronous memory request is received, timer 240 may be reset and re-started.

In a still further embodiment, memory controller 120 may adjust the priority of write requests in the following manner. Before any write requests have been received, counter 250 may be reset to zero. When a write request is received, counter 250 may be incremented and the received write request may be assigned a low priority as it is enqueued in MCQ 122. Counter 250 may be configured to trigger after it reaches a threshold value determined by a value stored in register 230. The value that is stored in register 230 may be programmed by software executing on a processing core or execution unit that is coupled to the memory controller. When counter 250 reaches the programmable threshold, the priority of the pending write requests may be changed to medium. Once the priorities of the pending write requests have been changed, they may be re-scheduled relative to any other pending memory requests in MCQ 122. If any corresponding write requests are pending in DCQ 124, their priorities may also be changed. Such pending memory requests may then be re-scheduled relative to any other pending memory requests in DCQ 124. The effect of increasing the priority of a batch of write requests that have aged in MCQ 122 tends toward sending a string of writes to DCQ 124, thereby causing some degree of write-bursting without actively associating write requests together. After the priorities of the pending write requests have been changed and when another write request is received, counter 250 may be reset to zero.

Figure 3:
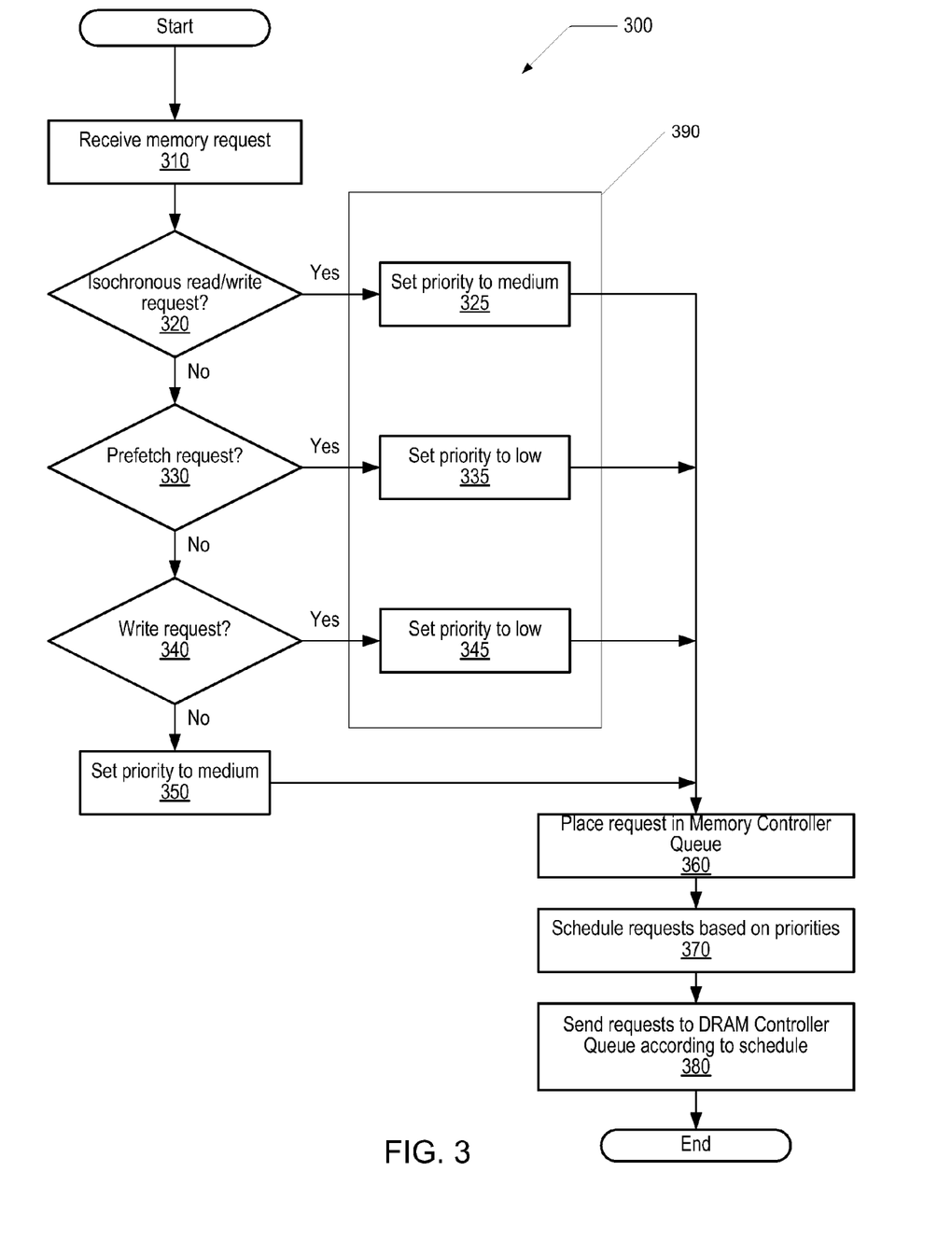
FIG. 3 illustrates one embodiment of a process that may be used to manage loading and unloading of a memory request queue.

Turning now to FIG. 3, one embodiment of a process 300 that may be used to manage loading and unloading of a memory request queue is illustrated. Process 300 may be executed in a continuous loop, although for simplicity, a single pass through the process is described. In the illustrated embodiment, process 300 may begin with reception of a memory request (block 310). If the received memory request is an isochronous read or write request (decision block 320), then the received memory request may be assigned a medium priority (block 325) and placed in an MCQ (block 360). If the received memory request is not an isochronous read or write request (decision block 320) and if the received memory request is a prefetch request (decision block 330), then the received memory request may be assigned a low priority (block 335) and placed in the MCQ (block 360). If the received memory request is not an isochronous read or write request or a prefetch request (decision block 330) and if the received memory request is a write request (decision block 340), then the received memory request may be assigned a low priority (block 345) and placed in the MCQ (block 360). If the received memory request is not an isochronous read or write request, a prefetch request, or a write request (decision block 340), then the received memory request may be assigned a medium priority (block 350) and placed in the MCQ (block 360). It is noted that while a "default" priority of medium is indicated in block 350, other embodiments may utilize a different default priority. Additionally, while each of the priorities shown in block 390 may seem to suggest fixed priorities for particular types of request, priorities for a given type may in fact be programmable. Once a memory request has been placed in the MCQ, it and any other memory requests that are pending in the MCQ may be scheduled based on their assigned priorities (block 370). When space is available in a DCQ, scheduled memory requests may be sent from the MCQ to the DCQ according to the schedule (block 380), completing process 300.

Figure 4:
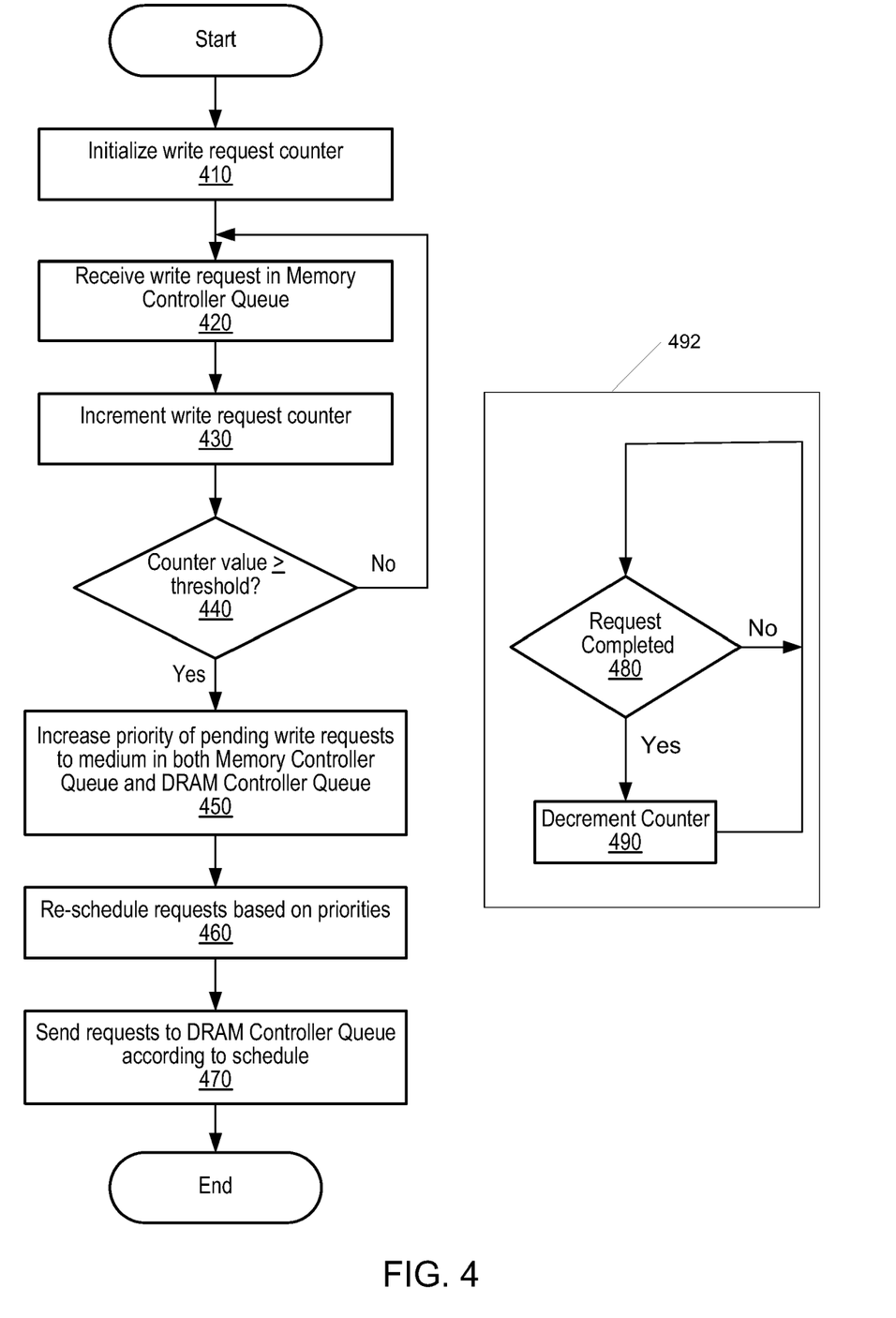
FIG. 4 illustrates one embodiment of a process that may be used to dynamically prioritize pending write requests.

FIG. 4 illustrates one embodiment of a process that may be used to dynamically prioritize pending write requests. Although a single pass through process will be described for simplicity, the process may execute in a continuous loop. The process may begin by initializing a write request counter (block 410). After the counter is initialized, when a write request is received in an MCQ (block 420), the counter may be incremented (block 430). If in this embodiment, after the counter is incremented, the counter value does not equal or exceed a programmable threshold value (decision block 440), the process may return to block 420 awaiting reception of another write request. If, after the counter is incremented, the counter value equals or exceeds a programmable threshold value (decision block 440), the priority of any pending write requests in either the MCQ or an associated DCQ may be increased from low to medium (block 450). Once the priorities of any pending write requests have been changed, all pending requests may be re-scheduled based on the new priority values (block 460). When space is available in the DCQ, scheduled memory requests may be sent from the MCQ to the DCQ according to the schedule (block 470), completing the process. Although in the embodiment previously described, the counter is configured to count from zero to a threshold value via positive increments, it will be apparent to one of ordinary skill in the art that in alternative embodiments, the counter may be configured to count from any first value to any second value. For example, the counter may be configured to count from the threshold value to zero by being decremented each time a write request is received and the priority of pending writes may be changed when the counter reaches zero. Also shown in FIG. 4 is a process 492 which may generally be performed in parallel with other activities depicted in FIG. 4. In the embodiment shown, process 492 monitors the status of pending requests. In response to detecting the completion of a write request (decision block 480), the write request counter is decremented.

Figure 5:
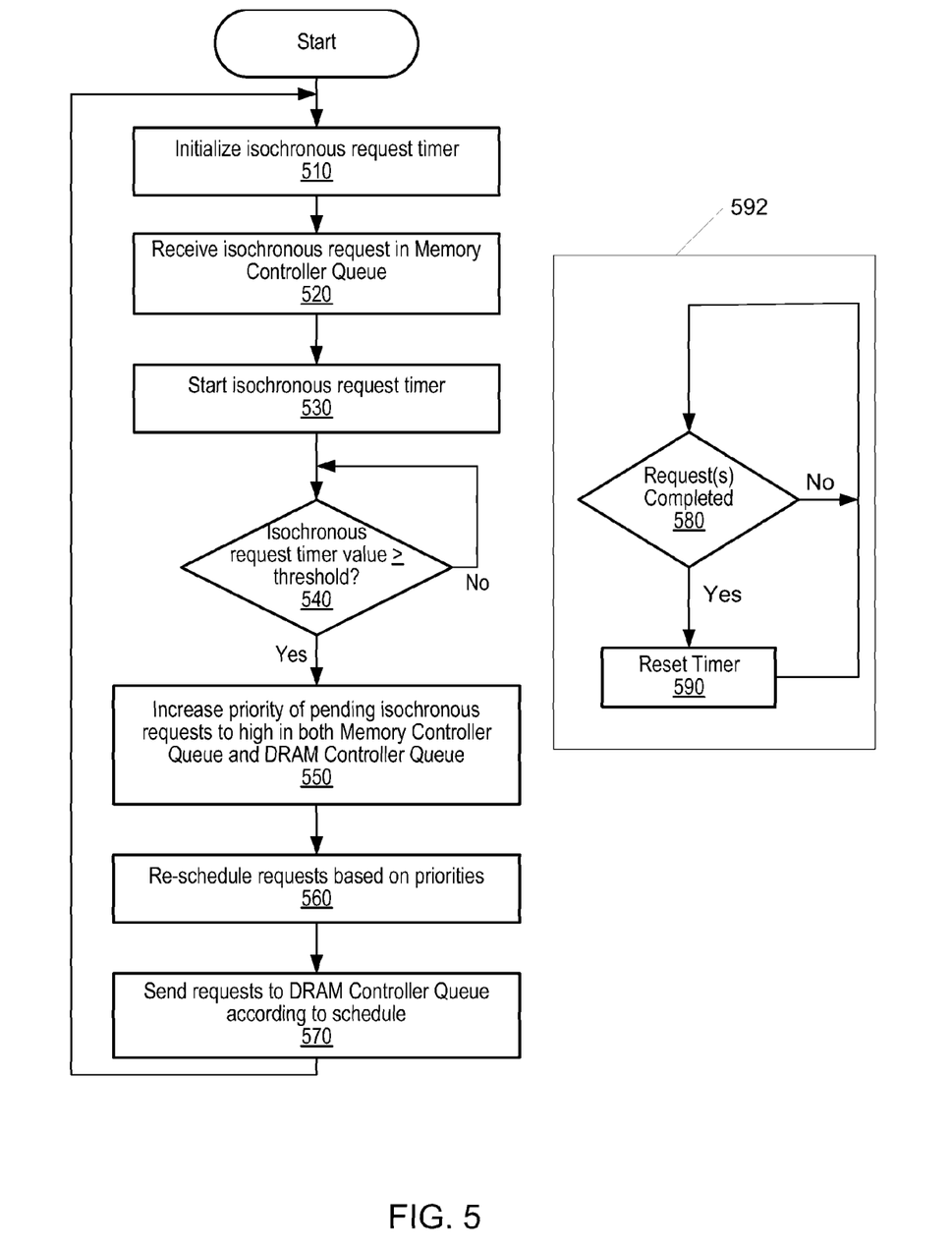
FIG. 5 illustrates one embodiment of a process that may be used to dynamically prioritize pending isochronous memory requests.

FIG. 5 illustrates one embodiment of a process that may be used to dynamically prioritize pending isochronous memory requests. Although a single pass through the process will be described for simplicity, in one embodiment, the process may execute in a continuous loop. The process may begin by initializing a timer (block 510). After the timer is initialized, when an isochronous request is received in an MCQ (block 520), the timer may be started (block 530). When the timer indicates that a threshold time has elapsed (decision block 540), the priority of any pending isochronous requests in either the MCQ or an associated DCQ may be increased from medium to high (block 550). Once the priorities of any pending isochronous requests have been changed, all pending requests may be re-scheduled based on the new priority values (block 560). When space is available in the DCQ, scheduled memory requests may be sent from the MCQ to the DCQ according to the schedule (block 570), completing the process. Although in the embodiment previously described, the timer is configured to count up to a threshold value, it will be apparent to one of ordinary skill in the art that in alternative embodiments, the timer may be equivalently configured to count down to zero from an initial threshold value. Also shown in FIG. 5 is a process 592 which may generally be performed in parallel with other activities depicted in FIG. 5. In the embodiment shown, process 592 monitors the status of pending requests. In response to detecting the completion of an isochronous request(s) (e.g., all prior isochronous requests have been completed at medium priority) (decision block 580), the isochronous request counter is reset.

Figure 6:
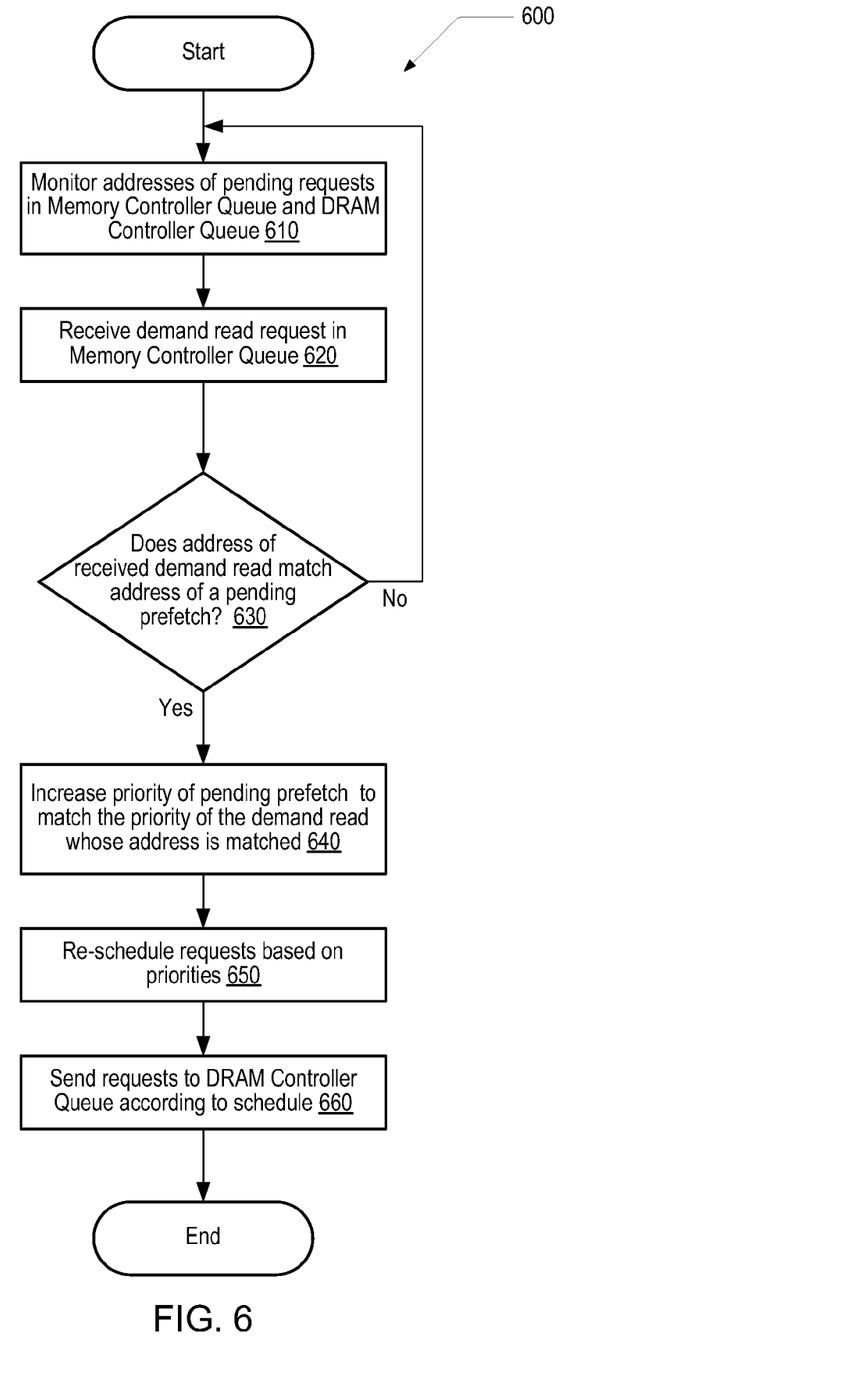
FIG. 6 illustrates one embodiment of a process that may be used to dynamically prioritize pending prefetch memory requests.

FIG. 6 illustrates one embodiment of a process 600 that may be used to dynamically prioritize pending prefetch memory requests. Although a single pass through process 600 will be described for simplicity, in one embodiment, process 600 may execute in a continuous loop. Process 600 may begin by monitoring the addresses of pending requests in an MCQ and an associated DCQ (block 610). When a demand read request is received (block 620), the address of the demand read may be compared to the monitored addresses of pending requests (decision block 630). If there are no pending prefetches whose addresses match the address of the received demand read, then process 600 may return to block 610 to monitor the addresses of pending requests. If an address of a pending prefetch matches the address of the received demand read, the priority of any pending prefetch requests in either the MCQ or an associated DCQ may be increased to match the priority of the received demand read (block 640). Once the priorities of any pending prefetch requests have been changed, all pending requests may be re-scheduled based on the new priority values (block 650). When space is available in the DCQ, scheduled memory requests may be sent from the MCQ to the DCQ according to the schedule (block 660), completing process 600.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory controller comprising:
   a first queue configured to store memory requests;
   a second queue configured to store memory requests received from the first queue; and
   control logic configured to assign a priority to each memory request stored in the first queue;
   wherein the control logic is configured to:
      assign a priority to each memory request stored in the first queue;
      select a given memory request in the first queue for conveyance to the second queue, wherein the given memory request is selected based at least in part on an assigned priority; and
      change a priority of at least one memory request stored in the first queue and at least one memory request stored in the second queue, in response to detecting a trigger.

2. The memory controller of claim 1, wherein in response to detecting the trigger corresponds to a given request type, the control logic is configured to change a priority of each memory request stored in each of the first queue and the second queue corresponding to the given request type.

3. The memory controller of claim 1, wherein the memory controller is further configured to maintain an entry in the first queue for a given memory request that is sent to the second queue until the given memory request is processed out of the second queue.

4. The memory controller of claim 1, wherein at least one stored memory request is a write request, the trigger comprises detecting that a number of write requests stored in the first queue is greater than or equal to a threshold value, and the memory controller is configured to increase a priority of each write request stored in the first queue and the second queue responsive to the trigger.

5. The memory controller of claim 4, wherein the threshold value is programmable.

6. The memory controller of claim 1, wherein at least one stored memory request is an isochronous memory request, the trigger comprises detecting that at least one isochronous memory request has been pending in the first queue for at least a predetermined time period, and the memory controller is configured to increase a priority of each isochronous memory request stored in the first queue and the second queue responsive to the trigger.

7. The memory controller of claim 6, wherein the predetermined time period is programmable.

8. The memory controller of claim 1, wherein at least one stored memory request is a prefetch request, the trigger comprises detecting a demand read request whose address matches an address of a stored prefetch request, and the memory controller is configured to increase a priority of each stored prefetch request in the first queue and the second queue whose address matches the address of the demand read request responsive to the trigger.

9. A system comprising:
   a processor;
   a memory coupled to the processor; and
   a memory controller comprising a first queue and a second queue, wherein the memory controller is configured to:
      store each received memory request from the processor in the first queue;
      assign a priority to received memory request stored in the first queue;
      select a given memory request in the first queue for conveyance to the second queue, wherein the given memory request is selected based at least in part on an assigned priority; and
      change a priority of at least one memory request stored in the first queue and at least one memory request stored in the second queue, in response to detecting a trigger.

10. The system of claim 9, wherein in response to detecting a trigger corresponds to a given request type, the control logic is configured to change a priority of each memory request stored in each of the first queue and the second queue corresponding to the given request type.

11. The system of claim 9, wherein the memory controller is further configured to maintain an entry in the first queue for a given memory request that is sent to the second queue until the given memory request is processed out of the second queue.

12. The system of claim 9, wherein at least one stored memory request is a write request, the trigger comprises detecting that a number of write requests stored in the first queue is greater than or equal to a threshold value, and the memory controller is configured to increase a priority of each write request stored in the first queue and the second queue responsive to the trigger.

13. The system of claim 9, wherein at least one stored memory request is an isochronous memory request, the trigger comprises detecting that at least one isochronous memory request has been pending in the first queue for at least a predetermined time period, and the memory controller is configured to increase a priority of each isochronous memory request stored in the first queue and the second queue responsive to the trigger.

14. The system of claim 9, wherein at least one stored memory request is a prefetch request, the trigger comprises detecting a demand read request whose address matches an address of a stored prefetch request, and the memory controller is configured to increase a priority of each stored prefetch request in the first queue and the second queue whose address matches the address of the demand read request responsive to the trigger.

15. A method comprising:
receiving memory requests;
storing each received memory request in a first queue;
assigning a priority to each memory request stored in the first queue;
selecting a given memory request in the first queue for conveyance to a second queue, wherein the given memory request is selected based at least in part on an assigned priority; and
changing a priority of at least one memory request stored in the first queue and at least one memory request stored in the second queue, in response to detecting a trigger.

16. The method of claim 15, wherein in response to detecting the trigger corresponds to a given request type, changing a priority of each memory request stored in each of the first queue and the second queue corresponding to given request type.

17. The method of claim 15, further comprising maintaining an entry in the first queue for a given memory request that is sent to the second queue until the given memory request is processed out of the second queue.

18. The method of claim 15, wherein at least one stored memory request is a write request, the trigger comprises detecting that a number of write requests stored in the first queue is greater than or equal to a threshold value, and the memory controller is configured to increase a priority of each write request stored in the first queue and the second queue responsive to the trigger.

19. The method of claim 15, wherein at least one stored memory request is an isochronous memory request, the trigger comprises detecting that at least one isochronous memory request has been pending in the first queue for at least a predetermined time period, and the memory controller is configured to increase a priority of each isochronous memory request stored in the first queue and the second queue responsive to the trigger.

20. The method of claim 15, wherein at least one stored memory request is a prefetch request, the trigger comprises detecting a demand read request whose address matches an address of a stored prefetch request, and the memory controller is configured to increase a priority of each stored prefetch request in the first queue and the second queue whose address matches the address of the demand read request responsive to the trigger.

21. The memory controller of claim 3, wherein if a priority of a request in the first queue that corresponds to a request stored in the second queue is changed, a priority of the corresponding request in second queue is also changed.

* * * * *

UNITED STATES PATENT AND TRADEMARK OFFICE
CERTIFICATE OF CORRECTION

PATENT NO. : 7,877,558 B2
APPLICATION NO. : 11/837943
DATED : January 25, 2011
INVENTOR(S) : Hughes et al.

Page 1 of 1

It is certified that error appears in the above-identified patent and that said Letters Patent is hereby corrected as shown below:

In the Claims:

Claim 9, col. 8, line 45, please replace -- assign a priority to receive memory -- with "assign a priority to each memory".

Signed and Sealed this
Third Day of May, 2011

David J. Kappos
*Director of the United States Patent and Trademark Office*